(12) United States Patent
Demele et al.

(10) Patent No.: US 10,349,239 B2
(45) Date of Patent: *Jul. 9, 2019

(54) SYSTEM AND METHOD FOR GENERATING DRIVER STATUS AND DESTINATION ARRIVAL NOTIFICATIONS FOR REDUCING DISTRACTED DRIVING AND INCREASING DRIVER SAFETY

(71) Applicants: Michael P. Demele, Los Altos, CA (US); Theodore C. Chen, Los Altos, CA (US)

(72) Inventors: Michael P. Demele, Los Altos, CA (US); Theodore C. Chen, Los Altos, CA (US)

(*) Notice: Subject to any disclaimer, the term of this patent is extended or adjusted under 35 U.S.C. 154(b) by 68 days.

This patent is subject to a terminal disclaimer.

(21) Appl. No.: 15/825,024

(22) Filed: Nov. 28, 2017

(65) Prior Publication Data
US 2018/0084394 A1 Mar. 22, 2018

Related U.S. Application Data

(63) Continuation of application No. 15/390,608, filed on Dec. 26, 2016, now Pat. No. 9,848,308.
(Continued)

(51) Int. Cl.
*H04W 4/20* (2018.01)
*H04W 4/21* (2018.01)
(Continued)

(52) U.S. Cl.
CPC .......... *H04W 4/21* (2018.02); *B60Q 9/00* (2013.01); *G07C 5/008* (2013.01); *G07C 5/02* (2013.01);
(Continued)

(58) Field of Classification Search
CPC .... H04W 4/027; H04W 4/046; H04M 1/6091
(Continued)

(56) References Cited

U.S. PATENT DOCUMENTS 8,295,854 B2 10/2012 Osann, Jr.
8,384,555 B2 2/2013 Rosen
(Continued)

FOREIGN PATENT DOCUMENTS

WO WO 2004/082248 9/2004

OTHER PUBLICATIONS

"T-Mobile debuts teen driving nanny," Jan. 19, 2011, Handsfreeinfo. com, URL: http://handsfreeinfo.com/t-mobile-debuts-teen-driving-nanny/, 2 pages.
(Continued)

*Primary Examiner* — Sam Bhattacharya

(57) ABSTRACT

System and method for generating notifications when a person is in a driving state, in a non-driving state, and optionally a destination arrival notification so that interested parties, such as family members, friends and/or co-workers, can make informed and proactive decisions to not call or text the person while driving is described. With push notifications, interested parties can thus make informed decisions and purposely delay making a phone call or texting a driver until after they have arrived at their destination and are no longer driving. As a result, drivers are not needlessly distracted, significantly improving road safety.

40 Claims, 12 Drawing Sheets

Related U.S. Application Data

(60) Provisional application No. 62/275,244, filed on Jan. 6, 2016.

(51) Int. Cl.

| | | |
|---|---|---|
| *H04L 29/08* | (2006.01) | |
| *H04M 1/725* | (2006.01) | |
| *B60Q 9/00* | (2006.01) | |
| *G07C 5/08* | (2006.01) | |
| *G07C 5/00* | (2006.01) | |
| *G07C 5/02* | (2006.01) | |
| *H04W 80/12* | (2009.01) | |

(52) U.S. Cl.
CPC ............ *G07C 5/0816* (2013.01); *H04L 67/26* (2013.01); *H04M 1/72569* (2013.01); *H04M 1/72552* (2013.01); *H04M 1/72572* (2013.01); *H04W 80/12* (2013.01)

(58) Field of Classification Search
USPC .................................. 455/418, 456.1–456.6
See application file for complete search history.

(56) References Cited

U.S. PATENT DOCUMENTS

| | | | |
|---|---|---|---|
| 8,543,135 B2 | 9/2013 | Goyal | |
| 8,706,143 B1 | 4/2014 | Elias | |
| 9,204,258 B2 | 12/2015 | Chen et al. | |
| 2003/0174051 A1* | 9/2003 | Naitou | B60R 25/102 |
| | | | 340/426.1 |
| 2008/0077865 A1 | 3/2008 | Hiles et al. | |
| 2011/0009107 A1 | 1/2011 | Guba et al. | |
| 2011/0171943 A1 | 7/2011 | Raviv | |
| 2011/0224901 A1 | 9/2011 | Aben et al. | |
| 2012/0053805 A1 | 3/2012 | Dantu | |
| 2012/0071151 A1 | 3/2012 | Abramson et al. | |
| 2012/0252484 A1 | 10/2012 | Andrews | |
| 2012/0289217 A1 | 11/2012 | Riemer et al. | |
| 2013/0102300 A1 | 3/2013 | Sigal et al. | |
| 2014/0342718 A1 | 11/2014 | Chen et al. | |
| 2015/0079967 A1* | 3/2015 | Mullins | H04W 48/04 |
| | | | 455/419 |
| 2016/0050315 A1* | 2/2016 | Malhotra | H04M 3/436 |
| | | | 455/414.1 |

OTHER PUBLICATIONS

"What is Sprint Drive First?," Drivefirst.Sprint.com, URL: https://sdf.support.safely.com/entries/21077541-What-is-Sprint-Drive-First-, Oct. 25, 2011, 1 page.

"Welcome to Sprint Drive First," Drivefirst.Sprint.com , URL: https://drivefirst.sprint.com/welcome.htm, Oct. 25, 2011, 2 pages.

"Protect employee drivers. Minimize business risk.," AegisMobility.com, URL: http://www.aegismobility.com/distracted-driving/fleetsafer-products, Jun. 2012, 3 pages.

"CellControl for Families," CellControl.com, URL: http://www.cellcontrol.com/stop-texting-while-driving-for-your-family/, Nov. 10, 2011, 4 pages.

"How it Works, CellControl," CellControl.com, URL: http://www.cellcontrol.com/stop-texting-while-driving-how-it-works/, Nov. 10, 2011, 1 page.

"TXT ME L8R," URL: http://www.txtmel8r.com/, May 15, 2012, 2 pages.

"SafeTexting R," Nerdworld, LLC, URL: https://itunes.apple.com/us/app/safetexting-r/id542190059?mt=8, Oct. 1, 2010, 2 pages.

"Safe Texting Campaign," URL: http://safetextingcampaign.com, Oct. 1, 2010, 2 pages.

"Drive Safe Mode," URL: http://www.drivesafemode.com/, Jan. 17, 2012, 1 page.

"Drive Safe Mode—Features," URL: http://www.drivesafemode.com/pages/features/, Jan. 17, 2012, 1 page.

"Groove by Katasi," Website URL:http://katasi.com/distracted-driving-solution-products/, Aug. 15, 2015, Katasi, Inc., 2 pages, downloaded on Dec. 14, 2016.

\* cited by examiner

FIG. 10

1. How would you like to name your family?

Demele family

2. Select Drivers to be displayed in the Family View

Select the drivers you would like to be visible in your shared Family View.

| Visible in Family View? | Driver Name | Enable Last Known Location? |
|---|---|---|
| ▸ | Lauren Paige | ▸ |
| ▸ | Candace Ann | ▸ |
| ▸ | Ted Chen | ▸ |
| ▸ | Mike (iphone) | ▸ |
| | Mike (Android) | |

3. Select which people can access the Family View

Select the people to invite to access your shared Family View. You can invite other people besides the drivers by clicking the "Add" button.

| Name | Phone | |
|---|---|---|
| Lauren Paige | | ✕ |
| Candace Ann | | ✕ |
| Ted Chen | | ✕ |
| Mike (iphone) | | ✕ |
| Mike (Android) | | ✕ |

Add

Share

SYSTEM AND METHOD FOR GENERATING DRIVER STATUS AND DESTINATION ARRIVAL NOTIFICATIONS FOR REDUCING DISTRACTED DRIVING AND INCREASING DRIVER SAFETY

RELATED APPLICATIONS

This application is a continuation of prior, co-pending U.S. application Ser. No. 15/390,608, filed on Dec. 26, 2016, which claims the benefit of priority under 35 U.S.C. § 119(e) to U.S. Provisional Application No. 62/275,244, filed Jan. 6, 2016 entitled "Hardware free Geo-Location based in-drive status and push arrival notification for driver safety," both of which are incorporated by reference herein for all purposes.

BACKGROUND

Field of the Invention

This invention relates to a system and method for generating and delivering driver status and destination arrival notifications, and more particularly, to generating for a driver an in-driving state notification, a not driving state notification and optionally a destination arrival notification for distribution to interested parties, such as family members, friends and/or co-workers. In response to the notifications, recipients can make an informed and proactive decision to not call or text the person while driving, resulting reduced incidences of distracted driving and increased road safety.

Description of Related Art

With the proliferation of mobile devices such as wireless telephones, smart phones, tablets and wearable Internet-connected computing devices, such as smart-watches, more and more people are communicating while on the go. For example, many automobile drivers will often engage in telephone conversations or text while driving. The danger of engaging in such behavior is well documented. Distracted drivers are at a significantly increased risk of causing an accident, often resulting in death, injury and/or property damage to themselves and/or others.

The problem of distracted driving is often exacerbated by family members, friends, co-workers, supervisors or others simply because they do not know that a person they wish to communicate with is driving. For example, a parent may text or call their son or daughter, un-aware that he or she may be driving. Similarly, a fleet manager or dispatcher may call or text an employee, again un-aware that the employee is driving. In either case, the driver will be distracted by the incoming phone call or text, particularly if they elect to participate in the phone call or read and/or respond to the text while driving. As a result, the ordinarily innocuous act of calling or texting may be unknowingly creatine a dangerous situation for loved ones, friends, and/or work colleagues if the person happens to be driving when contacted.

A system and method for generating driver status and destination arrival push notifications, distributed to interested parties such as family members, friends, work colleagues and/or others, is therefore needed.

SUMMARY OF THE INVENTION

The above-described problems are solved by a system and method for generating driver status and destination arrival push notifications, and more particularly, to generating notifications when a person is in a driving state, in a non-driving state, and optionally a destination arrival notification so that interested parties, such as family members, friends and/or co-workers, can make informed and proactive decisions to not call or text the person while driving. The present invention thus provides a unique and novel approach to presenting timely "peace of mind" safety information regarding the driving status of a person to interested parties, previously not possible. For example, parents can be notified when a child is driving or is in a vehicle or a fleet manager can be notified when an employee is driving. In either case, the notified party can purposely delay making a phone call or texting the person until after they have arrived at their destination and are no longer driving. As a result, the person is not needlessly distracted while driving, significantly improving road safety.

In one non-exclusive embodiment, the system and method involves the use of an application or "app" installed on a mobile device (e.g., a mobile phone or tablet computer) belonging to a person. The app silently runs a background process, determining when the mobile device is in a vehicle that is traveling over a road surface or not. When such a driving determination is made, an in-driving notice is generated by the app and wirelessly sent to a cloud computing infrastructure. Within the cloud infrastructure, a push notification is generated and is sent to one or more target recipients associated with the person. Alternatively, when the app determines that mobile device is no longer in a driving state, a not driving notice is generated and delivered to the cloud. In response, the cloud infrastructure generates and delivers to the target recipients a non-driving state notification. In various embodiments, the push notifications can be sent to the target recipients via a message (e.g., text, SMS, voice, email, etc.) or by updating one or more dashboard(s) that is/are accessible by the one or more target recipient(s) respectively.

In an alternative embodiment, the in driving or not driving notifications may optionally each include a date and time stamp.

In yet another alternative embodiment, the app may operate in cooperation with Location Services (e.g., GPS) functionality to provide a start geographic location when the in driving state is detected and an end geographic location when the non-driving state is detected. With start and end locations, the entire trip of the driver can be tracked, mapped and provided to interested parties, a feature many parents and fleet managers will find highly useful. In one variation of this embodiment, the driver's current location can also be provided by mapping a longitude/latitude location via maps (i.e. Google® Maps) on the interested parties mobile device. As an alternative to utilizing locations services to determine the start and end of a trip, the app may operate in cooperation with the OnBoard Diagnostic (OBD) system of the vehicle in determining the in driving status, and the non-driving status of the vehicle. In yet other embodiments, a location of a driver may be discerned by triangulating their phone's location to cell towers and/or wi-fi networks.

In yet another embodiment, the cloud computing architect can operate in cooperation with other cloud computing/communication domains and provide presence information (i.e., in driving, not driving states) of a multiplicity of drivers across one or multiple communication platforms. By providing such information regarding the current driving status of a large number of drivers across one or multiple platforms (e.g., What's App®, Viber®, Skype® etc.), the driver status can become almost universally known. Family members, friends, work colleagues, or anyone else attempting to communicate with the driver, can thus all make an informed decision to not phone or text a person while driving. As a result, the incidence of distracted driving can, in the aggregate, be significantly reduced. The overall incidence of traffic accidents and fatalities will likely decrease with the use of the present invention.

BRIEF DESCRIPTION OF THE DRAWINGS

The invention may best be understood by reference to the following description taken in conjunction with the accompanying drawings, which illustrate specific, but non-exclusive, embodiments of the invention.

FIG. 10 illustrates an exemplary dashboard for designating parties to receive push notifications for a family of designated drivers in accordance with one embodiment of the present invention.

It should be noted that like reference numbers refer to like elements in the figures.

The above-listed figures are illustrative and are provided merely as examples of embodiments for implementing the various principles and features of the present invention. It should be understood that the features and principles of the present invention may be implemented in a variety of other embodiments and the specific embodiments as illustrated in the Figures should in no way be construed as limiting the scope of the invention.

DETAILED DESCRIPTION OF SPECIFIC EMBODIMENTS

The invention will now be described in detail with reference to various embodiments thereof as illustrated in the accompanying drawings. In the following description, specific details are set forth in order to provide a thorough understanding of the invention. It will be apparent, however, to one skilled in the art, that the invention may be practiced without using some of the implementation details set forth herein. It should also be understood that well known operations have not been described in detail in order to not unnecessarily obscure the invention.

In the present application, the term "driver" is intended to be broadly construed to include any person in a vehicle. Consequently, as used herein, the term is intended to not only mean the person behind the wheel and operating a vehicle, but also passengers in a vehicle as well.

Figure 1:
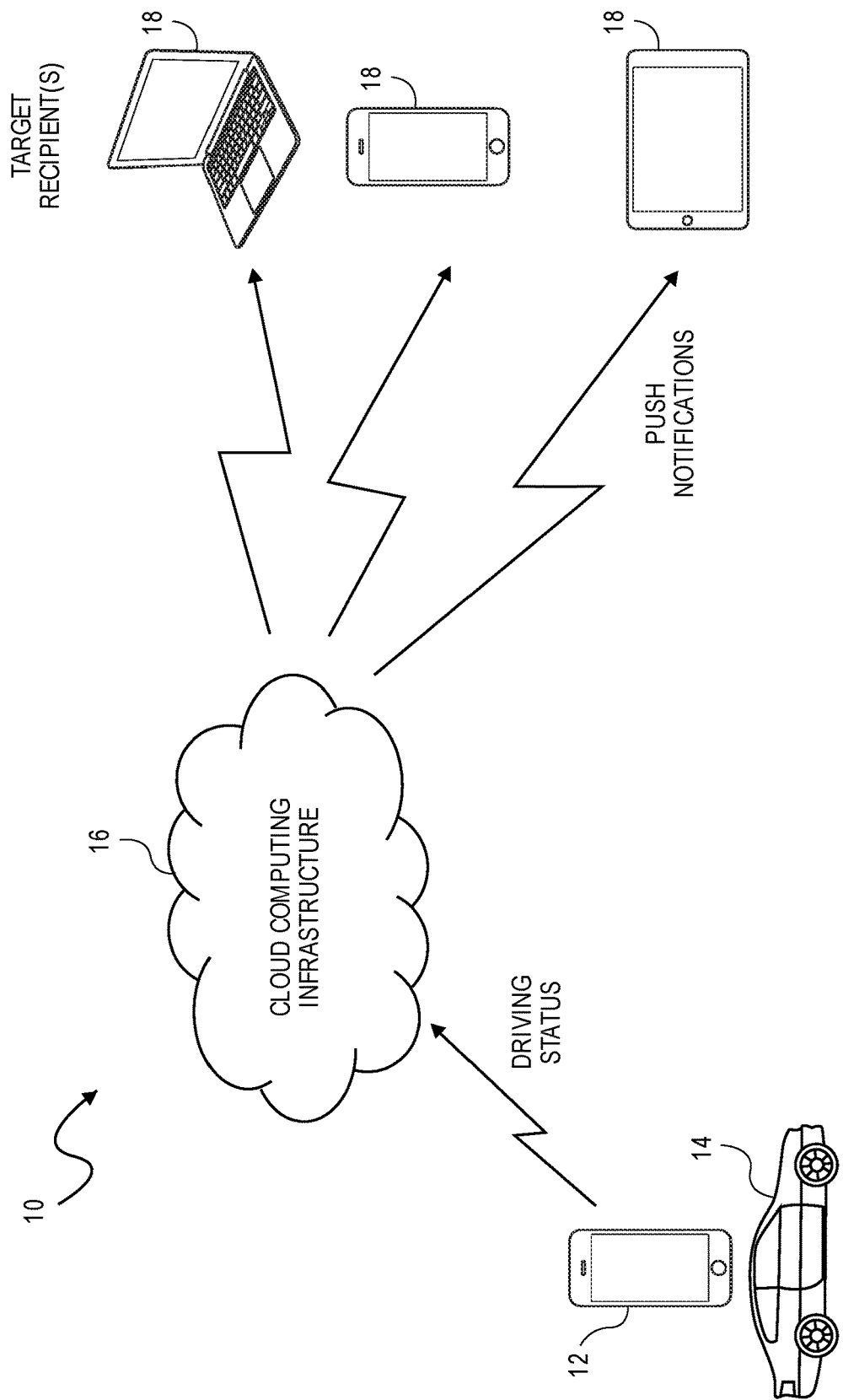
FIG. 1 is a diagram of a non-exclusive embodiment of a system for generating and delivering in driving and not driving push notifications in accordance with a non-exclusive embodiment of the invention.

Referring to FIG. 1, a system 10 for generating driver status push notifications delivered to target recipient(s) is illustrated. The system 10 includes a mobile device 12, belonging to or otherwise associated with a person (not shown) either operating or a passenger in a vehicle 14. As explained in more detail below, the mobile device 12 runs an application or "app" that is responsible for (i) determining when the mobile device 12 is in a driving state or in a non-driving state and (ii) wirelessly reporting the current state information to a cloud computing infrastructure 16. In response, the cloud computing infrastructure 16 generates push notifications that indicate the current driving status or state (e.g., driving or not driving) of the person, which are delivered to one or more computing device(s) 18 belonging to one or more target recipient(s). By providing such notifications to interested parties, such as family members, friends and/or co-workers, informed and proactive decisions to not call or text the person while driving can be made.

The push notifications thus provide timely, "peace of mind", safety information regarding the driving status of a person. For example, parents can be notified when a child is driving or is in a vehicle or a fleet manager can be notified when an employee is driving. In either example, the notified party can purposely delay making a phone call or texting the person until after they have arrived at their destination and are no longer driving. As a result, the person is not needlessly distracted while driving, significantly improving road safety.

It should be noted, for the sake of simplicity, only a single mobile device 12 in a vehicle 14 is illustrated. It should be understood, however, that in actual embodiments, the app is intended to be installed and run on a multiplicity of mobile devices 12 belonging to a large number of people and the push notifications are intended to be delivered to one or more target recipients associated with each driver. In this way, the overall incidence of distracted driving can be significantly reduced, improving road safety for all.

Figure 2:
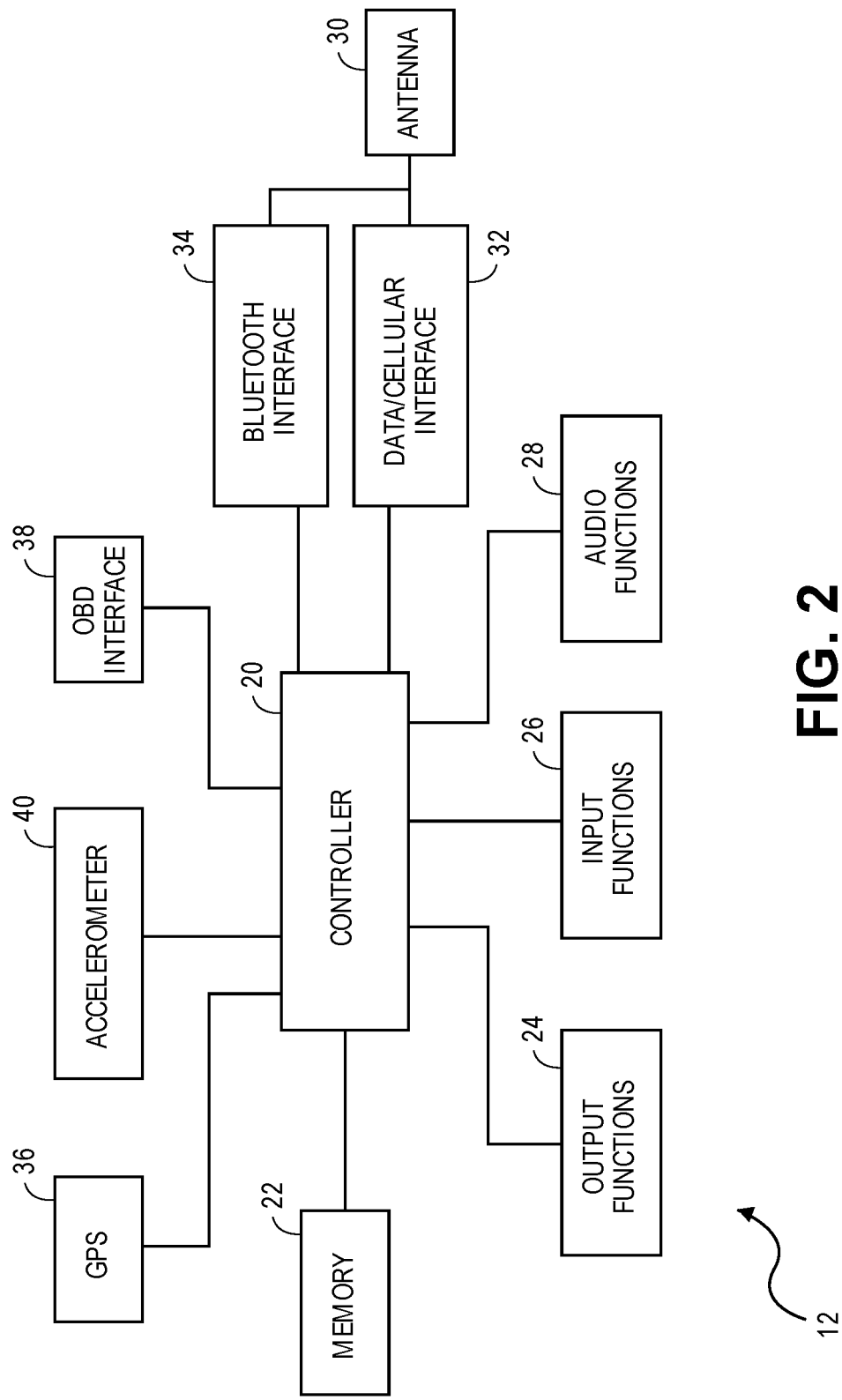
FIG. 2 is a block diagram of a non-exclusive embodiment of a mobile communication device in accordance with the principles of the present invention.

Referring to FIG. 2, a block diagram of a non-exclusive embodiment of an exemplary mobile device 12 in accordance with the principles of the present invention is shown. The mobile device 12 includes a controller 20, such as a microprocessor, memory 22 such as RAM, ROM, and/or other forms of persistent and/or non-persistent storage, output functions 24 such as a touch-sensitive or a non-touch-sensitive display, input functions 26 such as a virtual or actual keyboard, on/off switches, volume control buttons, vibration control buttons, etc., audio related functions 28 such as one or more speakers, microphones, audio alert generators, etc., a bi-directional antenna 30, coupled to a data/cellular interface 32 and a Bluetooth® interface 34, a GPS function 36, an interface 38 for coupling the controller 20 to an Onboard Diagnostic System (OBD) on a vehicle 14, and an accelerometer 40. As the operation of each of the elements 20 through 40 are well known, a detailed explanation is not provided herein. In various embodiments, the mobile device 12 is a cell phone, tablet computer, or wearable computer, such as a smart watch. In addition, the GPS functionality 36 can be provided by either a GPS application (e.g., Google® Maps) running on the mobile device 12 and/or the onboard GPS functionality on the vehicle 14 via the OBD interface 38 or any other location services provided by the cell phone or the telematics platform within the vehicle.

When a person has their mobile communication device 12 in a vehicle 14, it is typically in their pocket or purse, or placed within a designated location, such as a dashboard console. As such, the mobile device 12 is subject to "ambient" motion when the vehicle 14 is driving. By ambient motion, it is intended to mean the movement of the mobile device 12 in the X, Y and/or Z directions relative to the vehicle 14 as the vehicle idles, accelerates, brakes, sways when turning, travels over bumps, potholes, and other surface imperfections, and other motions of the vehicle 14 while driving.

In accordance with the present invention, the controller 20 in mobile device 12 is configured to execute the aforementioned app, which includes computer code embedded in a computer readable medium such as memory 32. As described in detail below, the app is configured to measure ambient motion patterns of the mobile device 12 and ascertain when the mobile device 12 is in or not in a vehicle 14 that is moving (i.e., travelling over a road surface). More specifically, the app is configured to:

(i) receive one or more sample signals from the accelerometer 40, which are indicative of the motion of the mobile communication device 12;

(ii) ascertain when the mobile device 12 is in a driving state based patterns of ambient motion indicative of when the mobile device 12 is in a vehicle 14 that is driving over a road surface;

(iii) ascertain when the mobile device 12 is in a non driving state based on motion patterns (or lack thereof) of the mobile device 12, for example, while the device is held or in a pocket or purse while the person is walking, or resting in a stationary position on a table or desk; and (iii) wirelessly transmit either the in driving state or non driving state status of the mobile device 12 to the cloud computing infrastructure 16.

The app determines patterns of ambient motion of the mobile device 12 from the sample signals generated by the accelerometer 40. When the motion patterns indicate that the vehicle 14 is in motion (e.g., driving), then an in driving state determination is made. Otherwise, the app assumes the mobile device 12 is in the non driving state.

During operation of the app, the accelerometer 40 periodically measures and samples the ambient X, Y and Z motion of the mobile device 12 as the vehicle 14 is driving. From these samples, the app is able to determine if the vehicle 14 is in a driving state or not in accordance with the algorithm described below.

Figure 3:
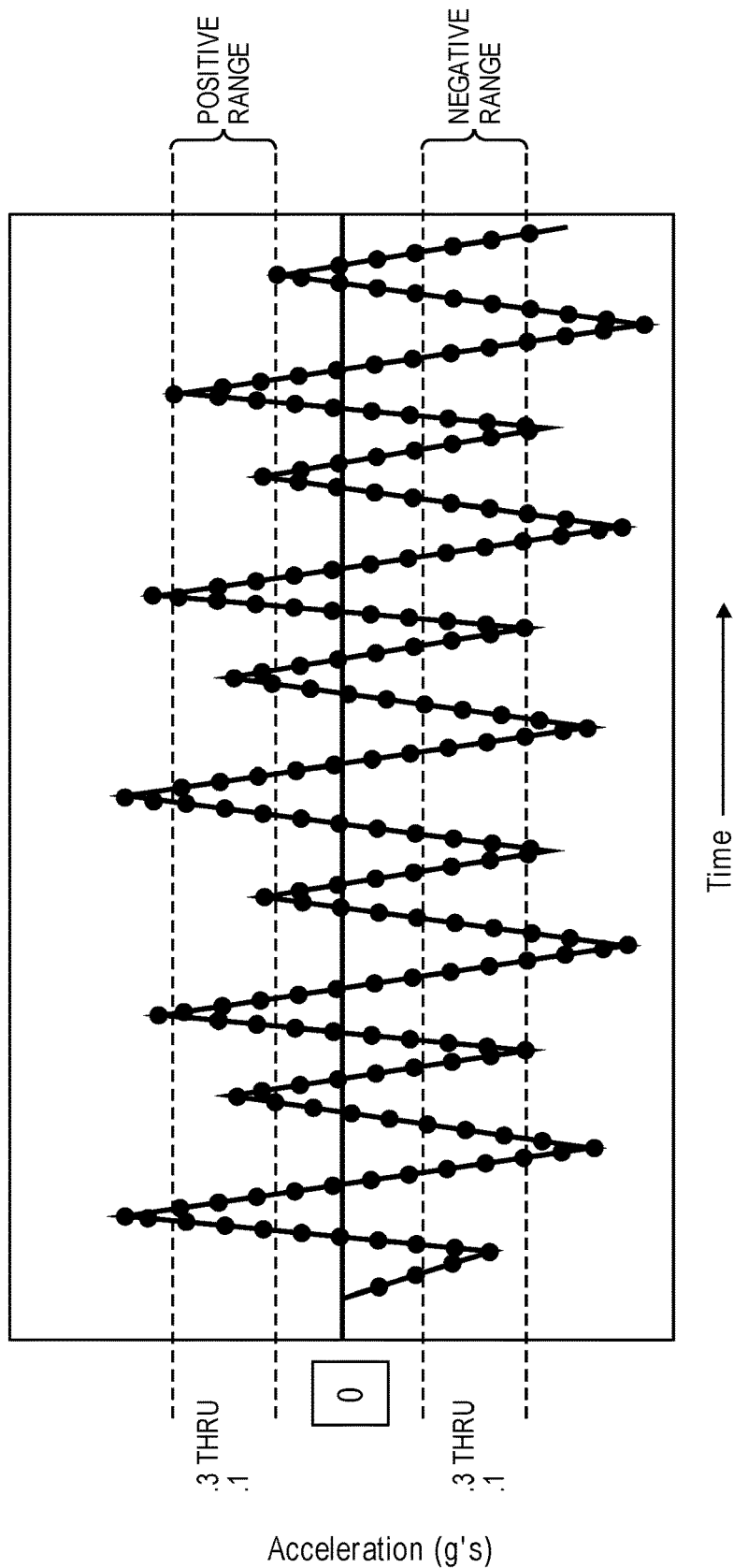
FIG. 3 is a diagram for ascertaining if a mobile communication device is in or not in a driving state in accordance with a non-exclusive embodiment of the present invention.

Referring to FIG. 3, a diagram for ascertaining if mobile device 12 is in a driving state or not is shown. In this diagram, a plot of a number of signal samples from the accelerometer 40 is provided over a predetermined period of time along the X axis. The magnitude of the measured g-force of each signal sample is provided along the Y axis.

A g-force magnitude of 0.0 indicates that the mobile device 12 is at rest. A certain percentage of g-force readings in a positive range of (e.g., 0.1 through 0.3 g's) and a negative range of (e.g., −0.1 through −0.3 g's) in this example indicate typical readings of the accelerometer 40 while in a vehicle 14 that is driving (i.e., the ambient motion of the mobile device 12 relative to the vehicle 14 while travelling over a road surface). Further in this example, G-force readings having magnitude greater than the positive and negative range (e.g., +/−0.1 to +/−0.3) are indicative of acceleration of the mobile device 12 beyond what is normally expected to be measured while driving for a particular vehicle 14. For example, a mobile phone will typically be subject to g-forces greater than (+/−0.3 g's) when moved from a pocket or purse to a person's ear when answering an incoming telephone call or when the mobile device 12 is in a person's pocket or purse while walking. Accordingly, such readings are typically used to make a determination that the mobile device 12 is not in the driving state.

In accordance with a non-exclusive embodiment, the algorithm used by the app is configured to ascertain the number of signal samples having a magnitude within the positive and negative ranges (e.g., +/−0.1 to 0.3) over a predetermined period of time. Thereafter, the app determines if the mobile device 12 is in the driving state (i.e., the mobile device 12 is in the vehicle 14 while driving) based on the number or percentage of the signal samples within the positive and negative ranges over the predetermined period of time. For example, if 22 of 100 positive g-force signal samples are in the positive range and 24 of 100 negative g-force signal samples are in the negative range, then a total of 23% of the 200 total readings fall in either of the two ranges. Based on this percentage, the app can make a determination that the mobile device 12 is in the driving state. In general, an approximate percentage range of 18% to 25% of total sample points in either the positive or negative ranges over a predetermined period of time is indicative that the mobile device 12 is in a vehicle that is in motion.

Thus, in a non-exclusive embodiment, in a background process the app: (i) continually receives the sampling signals at the periodic sampling interval from the accelerometer 40 and (ii) continually determines if the mobile device 12 is either in the driving state or the non driving state. In this manner, the app can continually provide the cloud computing infrastructure 16 with the current driving status of the owner of the mobile device 12.

It should be understood that for the sake of simplicity, the diagram of FIG. 3 plots acceleration of the mobile device 12 only in a single direction (either X, Y or Z). In actual implementations, however, the acceleration readings in any or all of the X, Y and Z directions may be used. In general, g-reading in multiple directions provides more accuracy. In such embodiments, the number of signal readings in the positive and negative ranges in each of the multiple directions may be combined together in determining if the mobile device 12 is in an undesirable or an acceptable motion state. Furthermore, the aforementioned range of (+/−0.1 to 0.3) g's, and the percentage range of 18% to 25%, are also merely exemplary and in no way should be construed as limiting the scope of the present invention. In alternative embodiments, different g-force ranges and ranges may be used. The aforementioned ranges indicative of an "in driving state" may vary based on a number of factors, such as the type of vehicle, the speed of the vehicle, road conditions, the smoothness (or lack thereof) quality of the road surface, etc. In order to take these factors into account, some embodiments of the app may include a "learning mode," which calibrates for the above factors in order to improve accuracy. For more details of the operation of the app, see commonly assigned co-pending U.S. Publication No. 2014/0342718 and U.S. Pat. No. 9,204,258, both incorporated by reference herein for all purposes.

In the above-described embodiment, the app relies exclusively on the signals generated by the accelerometer 40 provided on the mobile device 12. In alternative embodiments, however, the app may also use other signal generating devices, such as GPS device 36 and/or a vehicle speed signal received via interface 38 from the OBD on the vehicle 14, either in lieu of or in cooperation with the signals received from the accelerometer 40. In this latter embodiment, the app may use these other signals to make a decision if the mobile device 12 is in the driving state, the not driving state, and alternatively, determine and track start and stop geographic locations.

In a non-exclusive embodiment, the cloud computing infrastructure 16 is responsible for generating and delivering the in driving state and not driving state push notifications to the target recipient(s) for a given person. In accordance with the present application, a number of different embodiments are illustrated in FIGS. 4A through 4C.

Figure 4A:
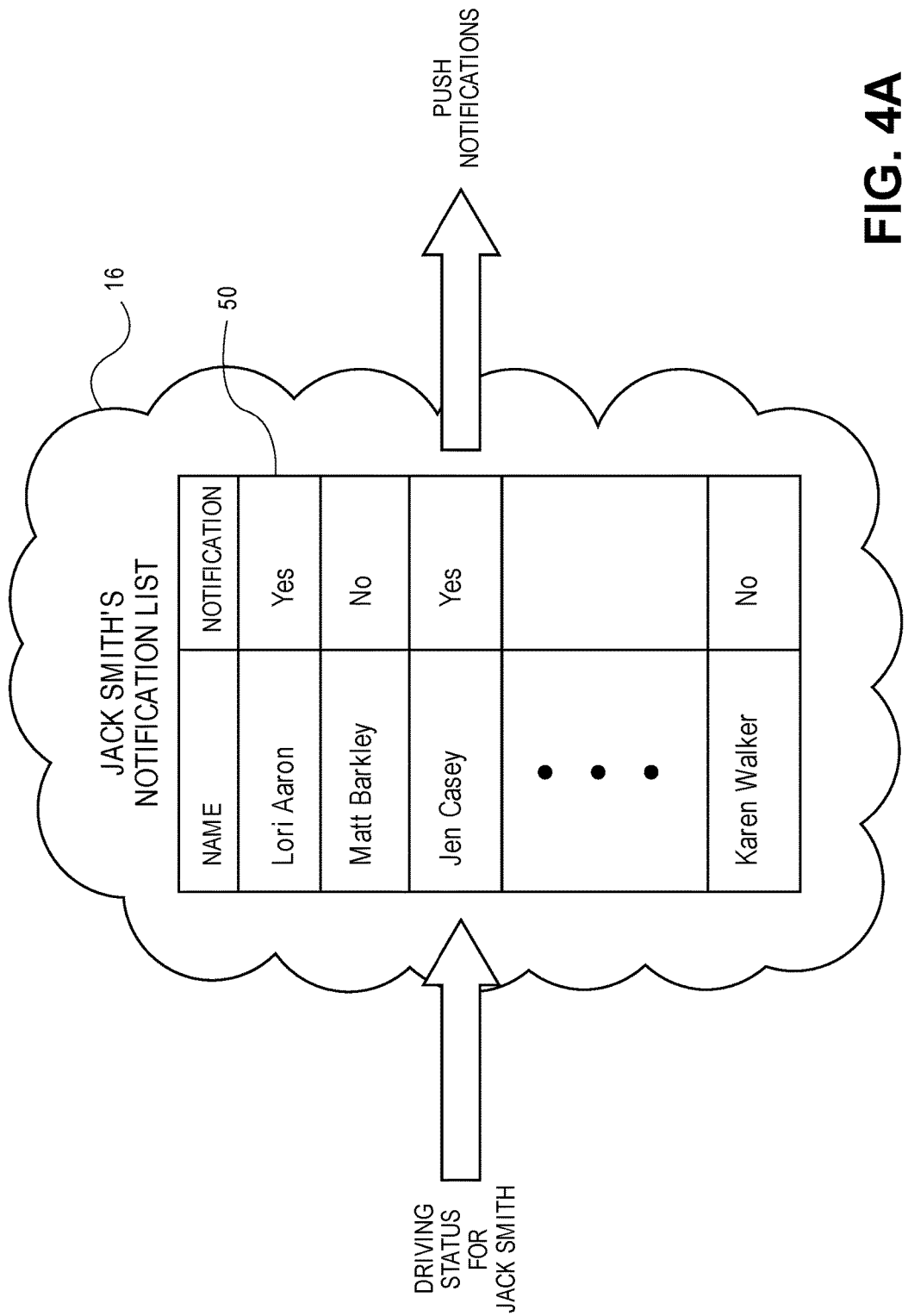
FIGS. 4A through 4C illustrate several non-exclusive embodiments for generating and delivering push notifications in accordance with the principles of the present invention.

Referring to FIG. 4A, a notification list 50 for an exemplary person named "Jack Smith" is maintained within the cloud computing infrastructure 16. In variations of this embodiment, the notification list 50 can be created in a number of different ways. For instance, Jack Smith may access his contacts list on his mobile device 12 and designate certain people to receive the push notifications, such as family members, friends, work supervisors, or other colleagues. Alternatively, the cloud computing infrastructure 16 may provide a dashboard portal that allows the aforementioned people or any other interested party to create the notification list 50. For example, if Jack Smith is a teenager, the portal may be accessed by Jack's parents, who can designate themselves and possibly others to receive push notifications regarding Jack's driving status and/or driving destinations. Alternatively, if Jack is a fleet driver, then Jack's supervisor and/or other work colleagues may have access to the notification list 50 and designate the parties to receive push notifications.

In this illustrative example, the names Lori Aaron and Jen Casey are designated to receive the push notifications, while the names Matt Barkely and Karen Walker are not. Accordingly, when the Jack's driving status changes are received by the cloud computing infrastructure 16 (e.g. in the driving state or not in the driving state), the designated individuals (Lori Aaron and Jen Casey) will receive push notifications, while the non-designated individuals (Matt Barkely and Karen Walker) will not.

Figure 4B:
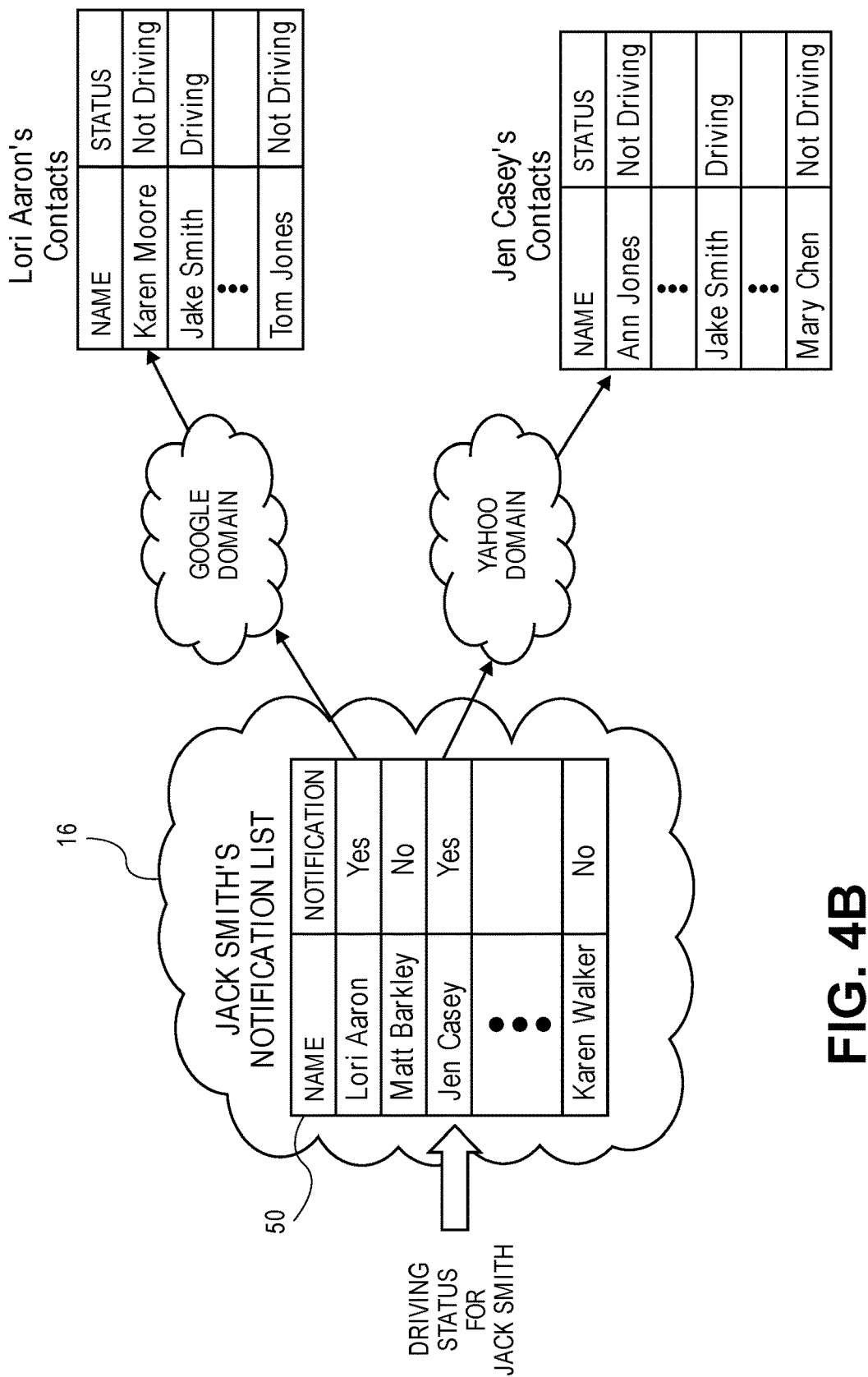
Figure 4C:
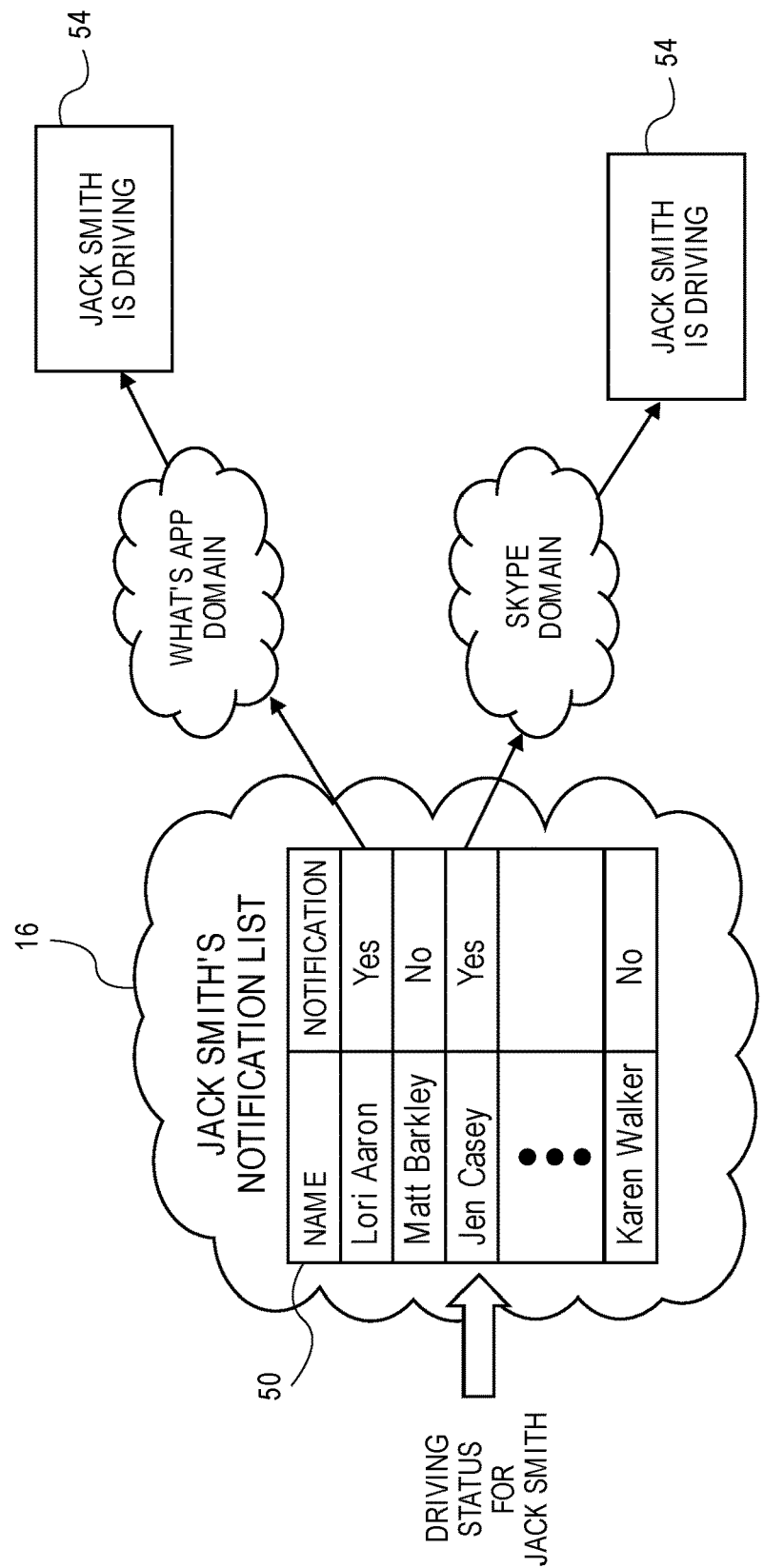

Referring to the FIG. 4B embodiment, the cloud computing infrastructure 16 is arranged to cooperate with other domains for the purpose of identifying and distributing push notifications. In this particular example, Jack Smith's notification list 50 indicates that Lori Aaron and Jen Casey are designated to receive push notifications. In the case of Lori Aaron, she happens to be a Google® user and maintains her contact information within the Google® cloud domain. Alternatively, Jen Casey happens to be a Yahoo® user and she maintains here contact information in the Yahoo® cloud domain. With this arrangement, the cloud computing infrastructure 16 shares Jack Smith's driving state (e.g., either driving or not driving) with the Google® and Yahoo® domains, which in turn, update Jack's driving status in Lori Aaron's and Jen Casey's contacts list respectively.

Referring to the FIG. 4C embodiment, another example of the cloud computing infrastructure 16 cooperating cross-platform with other cloud communication services is illustrated. In this particular example, Jack Smith's driving state (either in driving or not driving) is shared with two popular communication platforms, "What's App®" and Skype®. In each case, the infrastructure of the communication service will notify parties attempting to communicate with Jack of his driving status. For example, if a person wishes to send Jack a text message using What's App®, a push notification 54 is delivered to the person when Jack is selected as a message recipient. A similar push notification 54 is also provided to a person wishing to call Jack using Skype®. In either case, the person is notified of Jack's current driving state. In this way, the contacting party can make a conscious decision to not attempt to communicate with Jack until his status changes to not driving. It should be noted that What's App® and Skype® are merely exemplary. Similar notifications can be provided for any form of electronic communication, including but not limited to voice, text, SMS, email, or any other communication platform. This "presence" embodiment thus provides the ability to provide near universal notifications if people are in the driving mode or not.

In yet another alternative embodiment, the communication platforms can be configured to not only discourage, but prevent, any communication with the driver while in the in driving status. With this latter embodiment, incoming attempts to communicate with a person while driving can be stopped altogether or delayed. For example, phone calls or other live communication, such as Skyping, can be stopped by preventing the parties from establishing a synchronous connection, meaning the parties are incapable of communicating over a live connection. With other types of messages, such as text messages, their delivery can purposely be delayed in the cloud until the status of the driver transitions from driving to not driving. In yet other variations, the sender of a text message can be prevented from creating a message intended for a driver in the driving state, or alternatively, the text message can be created, but either locally stored on the sending device or the cloud and then delivered out of storage only when the driver is no longer driving.

Figure 5:
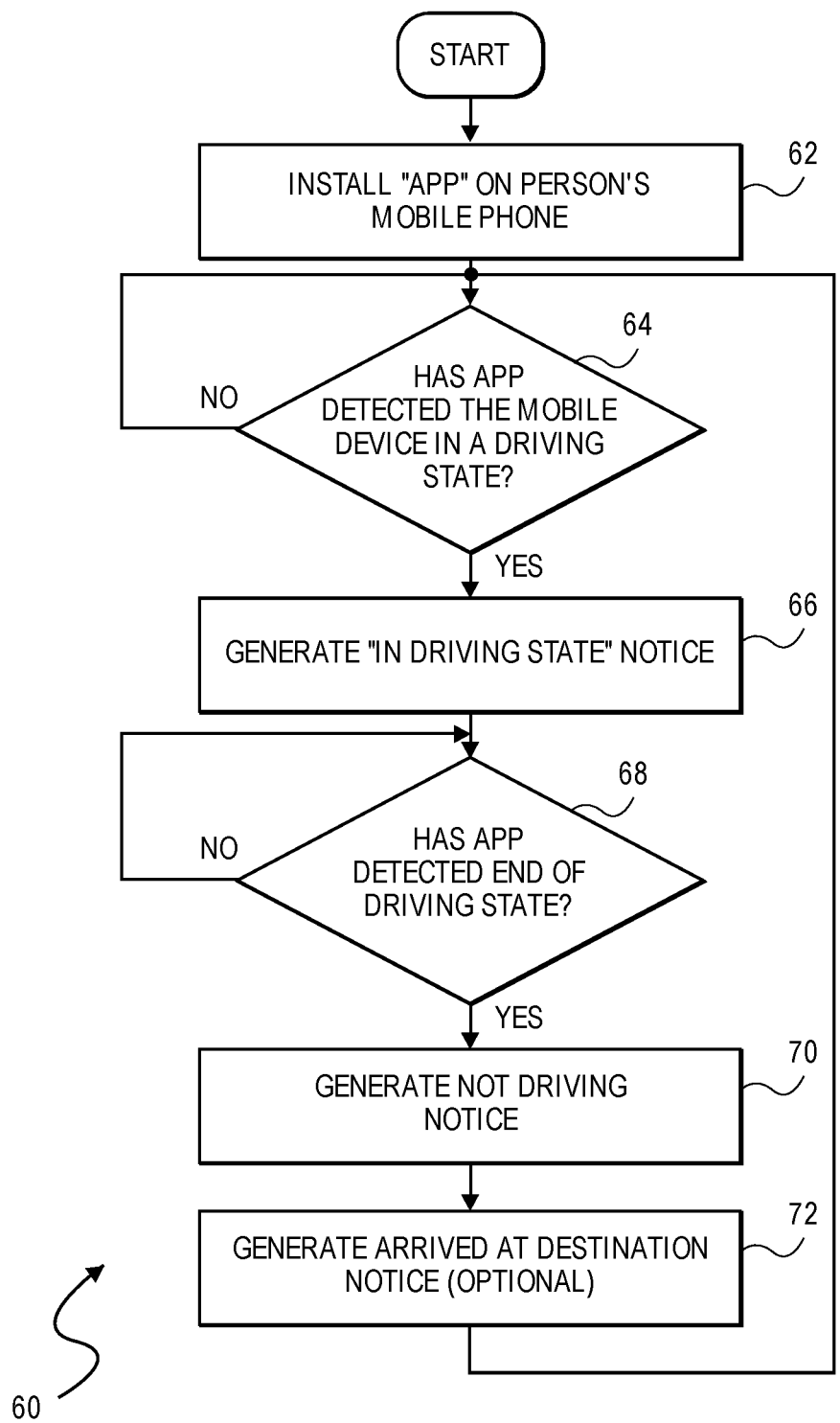
FIG. 5 is a flow diagram illustrating the steps of how a mobile device generates in driving and not driving notifications in accordance with the principles of the present invention.

Referring to FIG. 5, a flow diagram 60 illustrating the steps how a mobile device 12 generates in driving and not driving status notifications is illustrated.

In the initial step 62, the app is loaded onto a mobile device 12. As is well known in the art, the app can be downloaded over a wired or wireless network from any source, such as but not limited to the Apple® App store, the Google® Play market, or any application distribution outlet. Once an account is set up and the app is installed, the owner/user is identified and can be tracked through their mobile device 12 running the app.

In the decision step 64, the app makes a determination of when the mobile device 12 is in the driving state or not in the driving state. As previously described, the app makes the determination by running a background process for monitoring the motion patterns of the mobile device 12 relative to the motion of the vehicle 14 and/or receiving input from the OBD interface 38 when in a vehicle 14.

In step 66, a "driving" notice is generated by the app and transmitted to the cloud computing infrastructure 16 when the app determines that the mobile device 12 is in a driving state. In alternative embodiments, the driving notice can be time/date stamped and the start geographic location can also be reported to the cloud computing infrastructure 16.

In decision 68, the app continues to run in the background, monitoring the motion patterns of the mobile device 12.

In step 70, when it is determined that the mobile device 12 is no longer in the driving state, the app generates and transmits to the cloud computing infrastructure 16 a "not driving" notice.

In optional step 72, the app may also generate an "arrival at destination" notice along with a geographic location and date/time stamp.

Thus, using the above steps, the current status (i.e., either in driving or not driving) of the person associated with the mobile device 12 is reported to and known by the cloud computing infrastructure 16.

Figure 6:
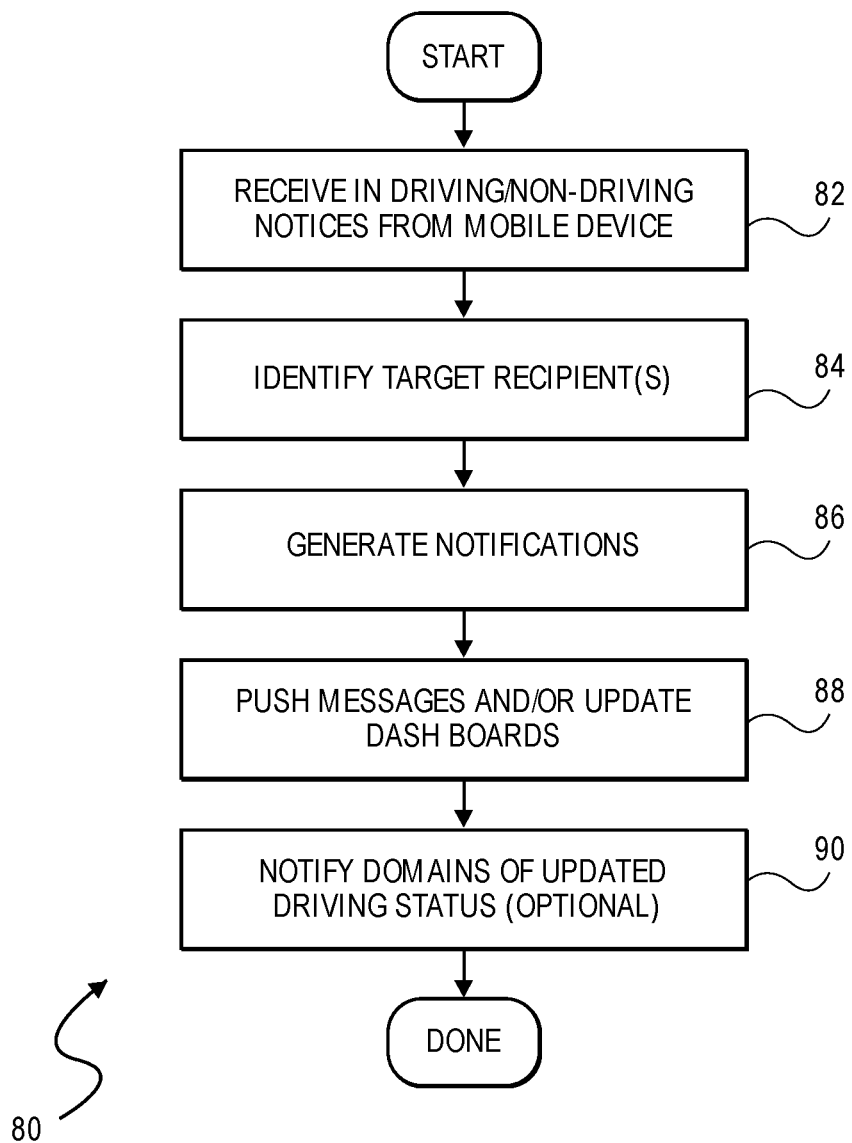
FIG. 6 is a flow diagram illustrating the steps of how a cloud computing infrastructure delivers driving and not driving push notifications to target recipient(s) in accordance with the principles of the present invention.

Referring to FIG. 6 a flow diagram 80 illustrating the steps how the cloud computing infrastructure 16 delivers push notifications to target recipient(s) is illustrated.

In the initial step 82, the cloud computing infrastructure 16 receives either the in driving or not driving state updates from the mobile device 12.

In step 84, the target recipient(s) are identified in response to the receipt of a notice. As previously noted, the target recipient(s) are typically identified by reading a notification list 50 associated with the person using or owning the mobile device 12.

In step 86, a proper notification is generated. For example, an "in driving" notification is generated when a driving notice is received and a "not driving" notice is generated when a not driving notice is received from the mobile device 12.

In step 88, the notice is pushed to communication devices 18 of the identified target recipient(s). In various embodiments, the push notifications can be delivered via messaging (email, text, SMS, voice, etc.) or by updating one or more dashboards accessible by the one or more recipients respectively.

Finally, in optional step 90, different computing domains are notified regarding the driving status of the person associated with the mobile device 12 as discussed above with regard to the FIG. 4B and FIG. 4C embodiments.

Thus, the flow chart of FIG. 6 illustrates the steps performed on the network to receive driving status update notices and for delivering push notifications to target recipient(s).

Push Notification Examples

Figure 7:
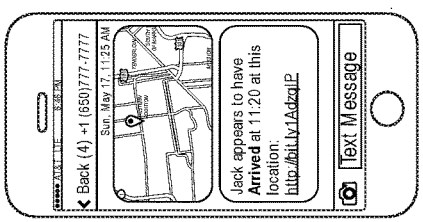
FIG. 7 illustrates a sequence of steps for generating text push notifications in accordance with a non-exclusive embodiment of the present invention.
Figure 7:
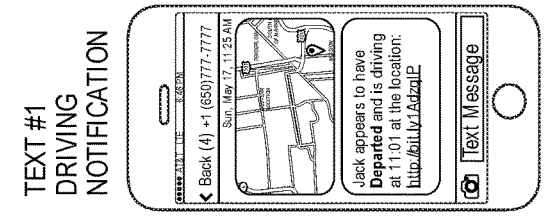
Figure 7:
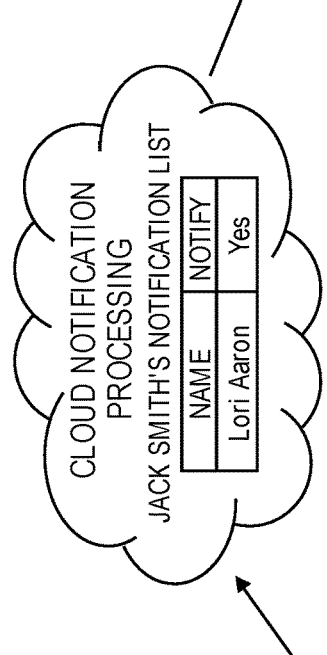
Figure 7:
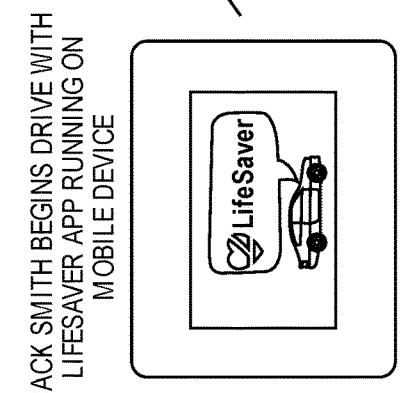

FIG. 7 illustrates a sequence of steps for generating text push notifications in accordance with a non-exclusive embodiment of the present invention. Specifically, from left to right, the app makes a determination that a mobile device 12 that belongs to Jack Smith is in a driving state. In response to receiving an in-driving status, the cloud computing infrastructure 16 generates and delivers text message notifications to a designated party (e.g., Lori Aaron) of Jack's departure and arrival.

Figure 8:
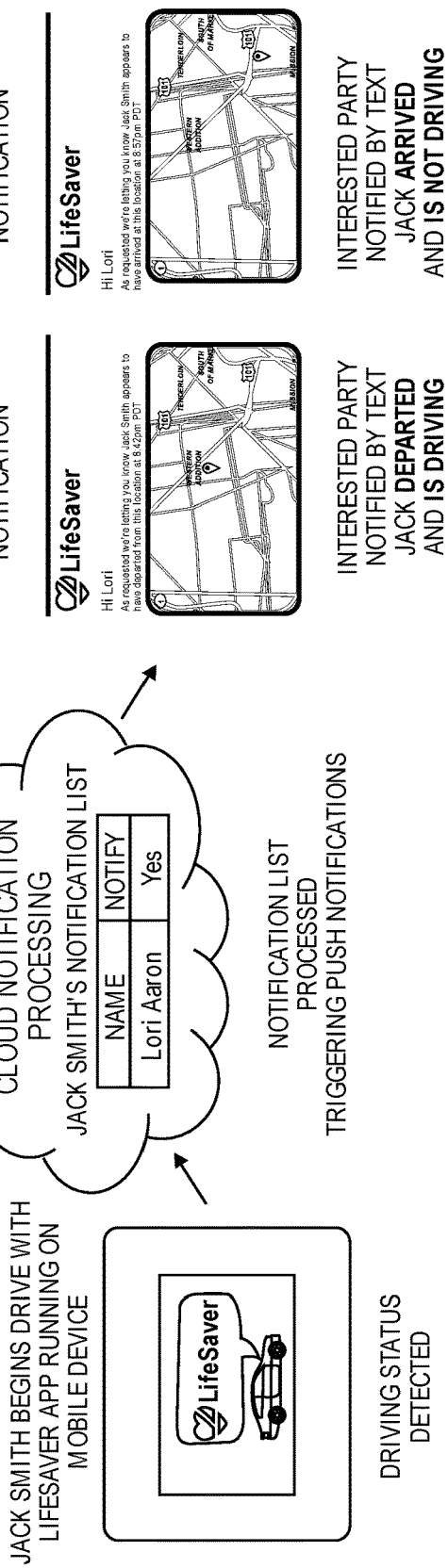
FIG. 8 illustrates a sequence of steps for generating email push notifications in accordance with a non-exclusive embodiment of the invention.

FIG. 8 illustrates a sequence of steps for generating email push notifications in accordance with a non-exclusive embodiment of the invention. This embodiment is essentially the same as that described above with respect to FIG. 7, except that email notifications of Jack's departure and arrival are generated.

Figure 9:
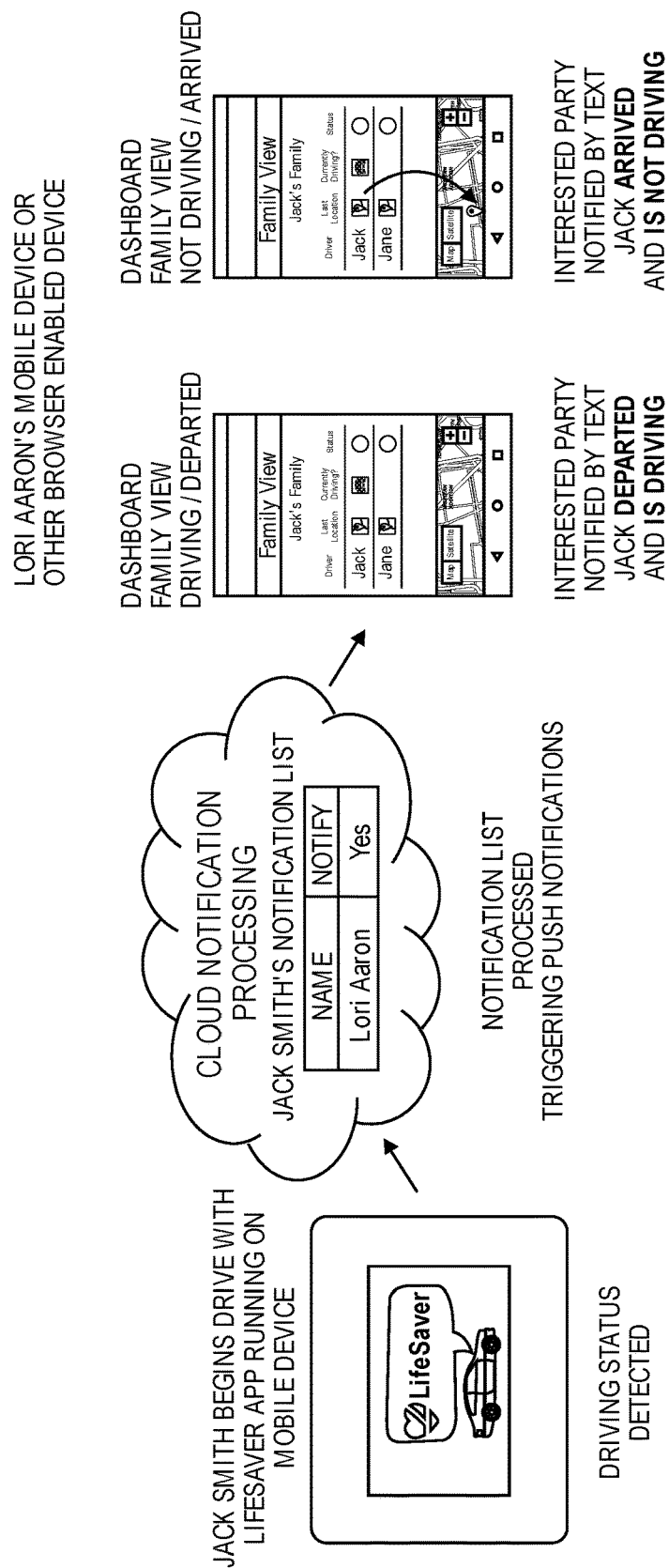
FIG. 9 illustrates a sequence of steps for generating push notifications received through a dashboard in accordance with another non-exclusive embodiment of the invention.

FIG. 9 illustrates a sequence of steps for generating push notifications received through a dashboard in accordance with another non-exclusive embodiment of the invention. Again, this embodiment is essentially the same as the previous two, except a web view dashboard accessible by the designated party (e.g., Lori Aaron) is updated upon Jack's departure and arrival as well as the current drive status of the driver as noted by the "Currently Driving" status field.

It should be noted for the sake of simplicity, only one party is designated to receive in driving or not driving status notifications in each of the FIGS. 7-9 examples. It should be understood, however, that in actual embodiments, the number of parties designated to receive such notifications may vary from one to many. In addition, the driving status of many drivers may simultaneously be tracked. As a result, the present invention as described herein has the potential of significantly reducing the incidence of distracted driving.

Dashboard Example for Creating Family View

Referring to FIG. 10, an exemplary dashboard 100 for designating parties to receive push notifications for a family of drivers is shown. In this particular example, the dashboard 100 includes a data entry field 102 for naming the family view (web view), a data entry field 104 for naming the drivers of the family visible within the dashboard. Within this data entry field 104, sub-fields are provided for defining the driver(s) name 106, designating if each named drivers is visible or not visible in the family view 108, and sub-fields 110 for designating if notifications for the last known location for each driver is enabled or disabled. Finally, a data entry field 112 is provided for designating the people that can access the family view. Within this data entry field 112, the people that can access the family view are defined. When the family view is "shared," a web view (URL link) is then sent specifically to those people designated to access the family view. It is important to note this family view can include anyone with a mobile number and that the recipient needs no special software or app installed to view the status of the driver(s) visible in the family view. Thus by viewing the dashboard, family members and other designated individuals can make proactive decisions to contact or not contact family members while driving.

In the above example, a dashboard is used by a family. It should be understood that a similar dashboard could be used by a company or other organization have a fleet of drivers. For example, a company name can be provided in data entry field 102. The drivers to be visible and tracked are listed in data entry field 104, along with drivers names in field 106, their visibility in family view field 108, and whether or not the last known location functionality for each driver is enabled or not in sub-fields 110. Finally, the members of the company, such as fleet managers, administrators, dispatchers, etc. can be designated as persons having access to the dashboard for viewing driver status. The dashboard thus allows fleet managers, administrators and/or dispatchers to track drivers and make proactive decisions when to contact or not contact the drivers depending on their location and/or driving status.

It should be understood that the aforementioned embodiments can be used for a multitude of drivers and push notifications can be delivered to a wide range of designated contacts. In this way, driver status information can be widely disseminated among the general public, resulting in far less instances of distracted driver and safer driving conditions.

Alternative Embodiments

In yet other embodiments, notifications can be relabeled as "driving started" and "driving ended" instead of merely providing an in driving status or not driving status. Such notices may be considered a more "user-friendly" alternative in certain circumstances.

In yet other embodiments, the system and method of the present invention can be further enhanced or modified to recognize a driver's route based on past driving history and make a reasonable estimation as to the driver's destination and estimated time of arrival. This embodiment is implemented by configuring the app to collect data related to start and end points of each drive. Based on the location of the vehicle during the drive, certain inferences about the route can be made and matched with previous end points of this driver. Thus, based on the current location of the vehicle, and the assumed end point of the current drive, the app can calculate or ping a navigation API service to calculate the remaining time to the destination (i.e., the Estimated Time of Arrival or "ETA"). In various alternatives of this embodiment, the ETA notifications can be continually generated at periodic intervals (e.g., every minute, every 5 minutes, 10 minutes, etc.), or alternatively, only when a person wishes to contact a driver. In the later example, a real time ETA calculation can be made and delivered to the person wishing to contact the driver. Regardless of the type of notification, knowing the ETA of the driver will also help to discourage the non-driver from making a dangerous call or texting during the drive if they know how long they will have to wait. In yet other embodiments, the app can be configured to operate with a GPS application or other GPS services on a user's mobile device to calculate and generate such ETA notifications.

Although many of the components and processes are described above in the singular for convenience, it will be appreciated by one of skill in the art that multiple components and repeated processes can also be used to practice the techniques of the system and method described herein. Further, while the invention has been particularly shown and described with reference to specific embodiments thereof, it will be understood by those skilled in the art that changes in the form and details of the disclosed embodiments may be made without departing from the spirit or scope of the invention. For example, embodiments of the invention may be employed with a variety of components and should not be restricted to the ones mentioned above. This would include embedding the driver status invention within any other app or device feature including commonly provided mobile device phone and VoIP apps. It is therefore intended that the invention be interpreted to include all variations and equivalents that fall within the true spirit and scope of the invention.

What is claimed is:

1. A method, comprising:
arranging for code to be executed on a mobile device associated with a first person, the code causing the mobile device to:
report to a cloud computing infrastructure an in driving state of the first person when the mobile device is in a vehicle that is in motion;
configuring the cloud computing infrastructure to provide a notification to a communication device associated with a second person, the notification providing a notice of the in driving state of the first person;
arranging for the communication device to locally store, but not transmit, communication created by the second person and directed to the first person; and
arranging for the communication device to transmit the locally stored communication after the first person is no longer in the driving state.

2. The method of claim 1, wherein the code further causes the mobile device to report to the cloud computing infrastructure a non-driving state of the first person either when either:
the mobile device is in the vehicle, but the vehicle is not in motion; or
the mobile device is no longer in the vehicle.

3. The method of claim 1, further comprising:
notifying one or more communication platforms of the in driving state of the first person;
arranging for a multiplicity of second persons, who are users of the one or more communication platforms, to locally store communications on their communications devices directed to the first person; and
arranging for the communication devices to transmit the communications out of local storage after the first person is no longer in the driving state.

4. The method of claim 3, wherein the one or more communication platforms are text or voice messaging platforms.

5. The method of claim 1, further comprising blocking synchronous communication between the first person and the second person while first person is in the driving state.

6. The method of claim 1, further comprising informing the second person of the in driving state of the first person by one of the following: (a) text messaging, (b) an email, (c) updating a dashboard, or (d) any combination of (a) through (c).

7. The method of claim 1, further arranging for the mobile device to track the location of the first person while the mobile device is in the vehicle as the vehicle travels between destinations.

8. The method of claim 1, further arranging for the mobile device to report an estimated time of arrival of the vehicle to a destination.

9. A method, comprising:
distributing to a first plurality of users code configured to run on a plurality of mobile communication devices associated with the plurality of first users respectively;
configuring each instantiation of the code to cause the mobile device on which the code is executing to:
(a) ascertain if the mobile device is in a vehicle that is in motion; and
(b) report an in driving state of the associated first user to a cloud computing infrastructure when the mobile device ascertains that the mobile device is in the vehicle that is in motion;
arranging for the cloud computing infrastructure to share with selected second users the reported in driving state of the first plurality of users respectively; and
arranging for communication devices belonging to the selected second users to:
locally store, but not transmit, outgoing communications directed to recipients among the first plurality of users who are in the driving state; and
transmit the communications out of local storage after the recipients are no longer in the driving state respectively.

10. The method of claim 9, further comprising generating push notifications on behalf of each of the first plurality of users while in the driving state, the push notifications sent to pre-designated contact(s) associated with each of the first plurality of users respectively.

11. The method of claim 10, wherein the push notifications are sent by one or more of the following: (a) text messaging, (b) email, (c) via a dashboard, or (d) any combination of (a) through (c).

12. The method of claim 9, further comprising sending the push notifications to the selected second users when the selected second users attempt to communicate with members of the first plurality of users while in the driving state respectively.

13. The method of claim 9, wherein the first plurality of users and the selected second users are users of one or more messaging platforms and the arranging of the communication devices belonging to the selected second users to locally store, but not transmit, the outgoing communications reduces the incidence of distracted driving among the first plurality of users.

14. The method of claim 9, further comprising configuring each instantiation of the code to determine if the mobile device on which the code is executing is in motion based on ambient motion patterns of the mobile device.

15. The method of claim 9, further comprising configuring each instantiation of the code to cause the mobile device on which the code is executing to ascertain and report to the computing infrastructure when the mobile device is no longer in the driving state either when:
the vehicle, in which the mobile device is located, is not in motion; or
the mobile device is no longer in the vehicle.

16. The method of claim 15, arranging for the cloud computing infrastructure to share among the selected second users the in driving state or non-driving state of each of the first plurality of users respectively.

17. A method, comprising:
arranging for a mobile device associated with a first person to report to a cloud computing infrastructure an in driving state of the first person while the mobile device is in a vehicle that is in motion;
arranging for a communication device, associated with a second person, to locally store but not transmit communication for the first person while the first person is in the in driving state; and
arranging for the communication device to transmit the locally stored communication to the first person after the first person is no longer in the driving state.

18. The method of claim 17, further comprising arranging for the mobile device to further report to the cloud computing infrastructure a non-driving state of the first person either when:
the mobile device is in the vehicle, but the vehicle is not in motion; or
the mobile device is no longer in the vehicle.

19. The method of claim 17, further comprising:
notifying one or more communication platforms of the in driving state of the first person after the mobile device reports the in driving state of the first person;
arranging for a multiplicity of second persons, who are users of the one or more communication platforms, to locally store communications, directed to the first person, on their communications devices after the mobile device reports the in driving state of the first person; and
arranging for the communication devices to transmit the communications out of local storage after the first person is no longer in the driving state.

20. The method of claim 19, wherein the one or more communication platforms are text or voice messaging platforms.

21. The method of claim 17, further comprising blocking synchronous communication between the first person and the second person while the first person is in the driving state.

22. The method of claim 17, further comprising informing the second person of the in driving state of the first person by one of the following: (a) text messaging, (b) email, (c) updating a dashboard, or (d) any combination of (a) through (c).

23. The method of claim 19, wherein the multiplicity of second persons are users of one or more text or voice messaging platforms.

24. The method of claim 17, further arranging for the mobile device to track the location of the first person while the vehicle travels between destinations.

25. The method of claim 17, further arranging for the mobile device to report an estimated time of arrival of the vehicle to a destination.

26. The method of claim 17, wherein arranging the mobile device to report the in driving state of the first person to the cloud computing infrastructure further comprises:
arranging for the mobile device to execute code, the code configured to cause the mobile device to:
ascertain when the mobile device is in the vehicle that is in motion; and
report the in driving state of the first person to the cloud computing infrastructure when the mobile device ascertains that the mobile device is in the vehicle that is in motion.

27. A method comprising arranging for a communication device of a first person attempting to send a text or voice message to a second person to store the text or voice message in local storage on the communication device while the second person is in a driving state and to transmit the text or voice message out of the local storage after the second person transitions to a non-driving state.

28. The method of claim 27, further comprises arranging for the communication device to execute code, the code causing the communication devices to store the text or voice messages in the local storage and to send the text or voice messages to the second person after the second person transitions to the non-driving state.

29. The method of claim 27, further comprising:
providing a notification to the communication device when the second person is in the driving state;
arranging for the communication device to store the text or voice message in the local storage in response to the notification.

30. The method of claim 29, further comprising:
providing a second notification to the communication device after the second person transitions to the non-driving state; and
arranging for the communication device to send the text or voice message out of the local storage in response to the second notification.

31. The method of claim 27, further comprising maintaining a computing infrastructure on a communication network, the computing infrastructure arranged to receive a first notification and a second notification from a mobile communication device associated with the second person,
wherein the first notification is indicative of the mobile communication device in a vehicle that is in motion and the second notification is indicative of the mobile communication device either (a) in the vehicle but the vehicle is not in motion or (b) not in the vehicle.

32. The method of claim 27, further comprising maintaining a computing infrastructure on a communication network, the computing infrastructure arranged to:
receive a first notification from a mobile device associated with the second person, the first notification indicative of the mobile device in a vehicle that is in motion; and
send to the communication device of the first person a second notification informing the communication device that the second person is in the driving state in response to the first notification.

33. The method of claim 32, wherein the second person is a contact on a contact list maintained by the first person.

34. The method of claim 32, wherein the communication device is configured to store the text or voice message in the local storage following receipt of the second notification and to transmit the text or voice message out of the local storage in response to a third notification from the computing infrastructure indicative of the second person transitioning to the non-driving state.

35. The method of claim 27, further comprising maintaining a computing infrastructure on network, the computing infrastructure arranged to cooperate with one or more text or voice messaging platform(s) by informing a multiplicity of users of the one or more text or voice messaging platform(s) of the in driving state of the second person.

36. The method of claim 35, further comprising arranging for text or voice messages directed to the second person and created by one or more of the multiplicity of users to be locally stored on communication devices associated with the one or more users while the second person is in the driving state.

37. The method of claim 27, further comprising arranging for a mobile device associated with the second user to:
   detect when the mobile device is in a vehicle that is in motion; and
   provide a notice to a computing infrastructure on a communication network indicative of the second user in the driving state in response to the detection.

38. The method of claim 37, further comprising arranging for the mobile device to send a second notice to the computing infrastructure when the mobile device ascertains either that the mobile communication device (a) is in the vehicle but the vehicle is not in motion or (b) is not in the vehicle.

39. The method of claim 27, further comprising arranging for a mobile device associated with the second user to execute code, the code causing the mobile device to:
   detect when the mobile device is in a vehicle that is in motion;
   provide a notice to a computing infrastructure on a communication network indicative that the second user is in the driving state in response to the detection; and
   send a second notice to the computing infrastructure when the mobile device ascertains that the mobile device either (a) is in the vehicle but the vehicle is not in motion or (b) is not in the vehicle.

40. The method of claim 27, further comprising arranging for the communication device to execute code, the code causing the communication device to:
   store the text or voice message in the local storage on the communication device in response to receiving a notice over a communication network indicative of the second person in the driving state; and
   transmit the text or voice messages out of the local storage after receiving another notice indicative that the second person has transitioned to the non-driving state.

* * * * *